Aug. 24, 1965  F. C. SCHMIDT ETAL  3,202,247
SELF-ADJUSTING CLUTCH BRAKE
Filed Nov. 10, 1961  3 Sheets-Sheet 1

INVENTORS:
FREDERICK C. SCHMIDT,
DAVID L. MOORE,

BY *D. Emmett Thompson*,
THEIR ATTORNEY.

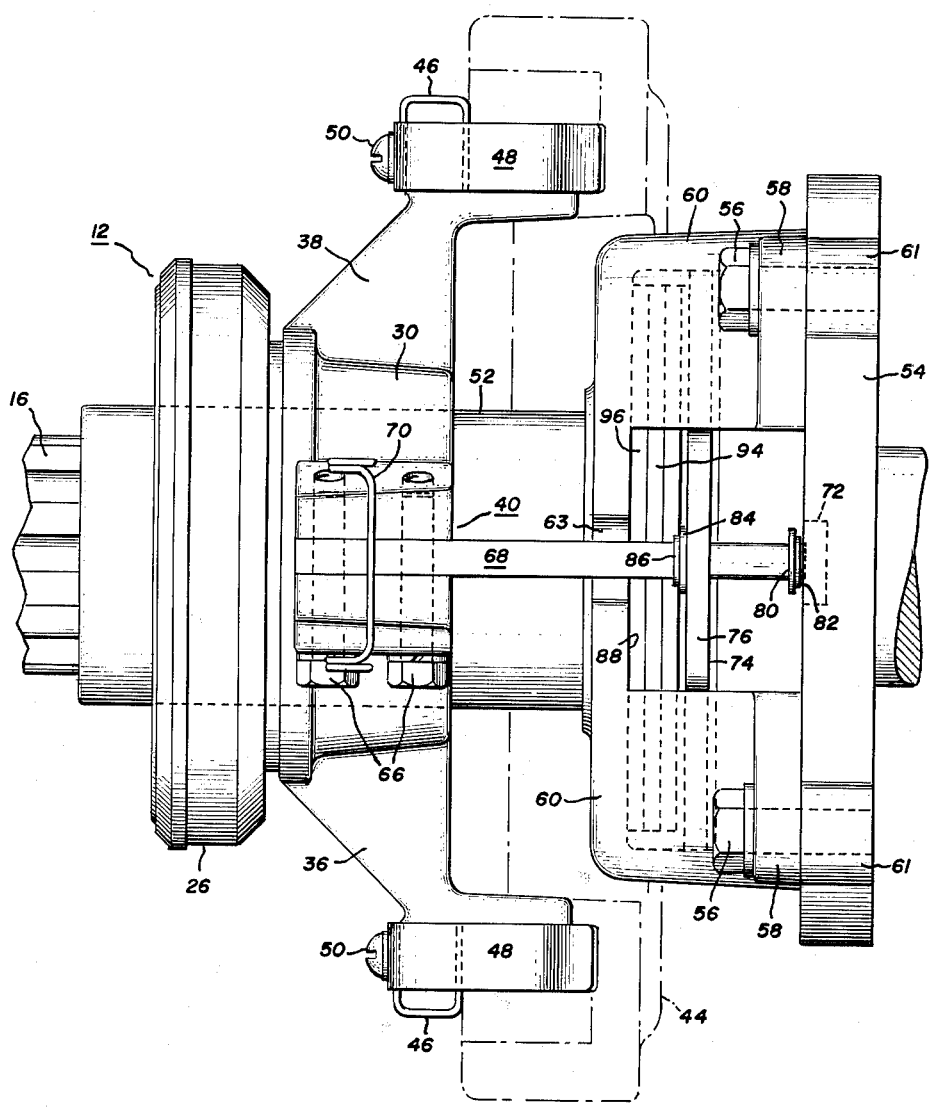

Aug. 24, 1965    F. C. SCHMIDT ETAL    3,202,247
SELF-ADJUSTING CLUTCH BRAKE
Filed Nov. 10, 1961    3 Sheets-Sheet 3
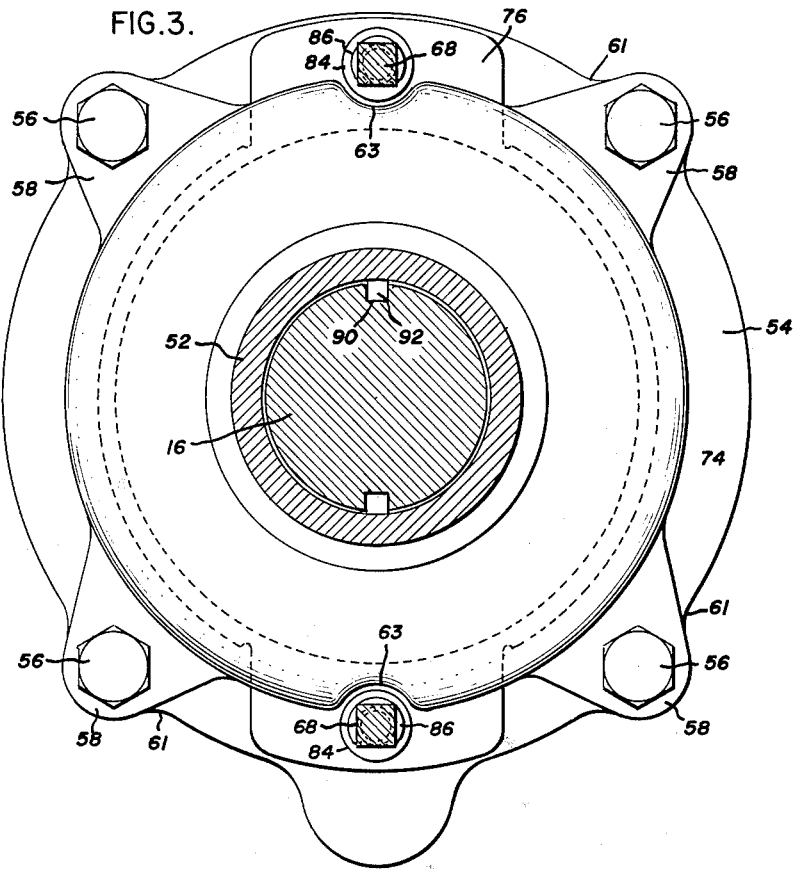
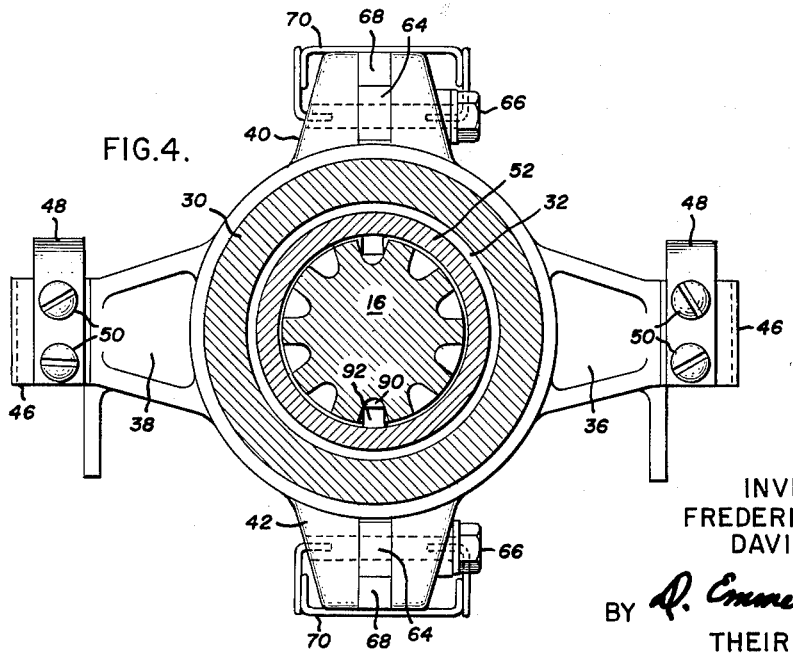
INVENTORS:
FREDERICK C. SCHMIDT,
DAVID L. MOORE,
BY D. Emmett Thompson
THEIR ATTORNEY.

3,202,247
SELF-ADJUSTING CLUTCH BRAKE
Frederick C. Schmidt, Syracuse, and David L. Moore, De Witt, N.Y., assignors to Lipe-Rollway Corporation, Syracuse, N.Y., a corporation of New York
Filed Nov. 10, 1961, Ser. No. 151,523
5 Claims. (Cl. 192—13)

This invention relates to and has as a general object a new and improved inertia brake for a "push" type automotive clutch.

In my co-pending application, Serial Number 103,068, now Patent No. 3,105,579 filed April 14, 1961, there is disclosed a similar type clutch and reference may be had to that application for a more complete understanding of the invention.

More specifically the invention relates to a new and improved clutch brake having a novel self-adjusting brake feature to compensate for wear in the clutch.

The invention consists in the novel features and in the combinations and constructions hereinafter set forth and claimed.

In describing this invention reference is had to the accompanying drawings in which like characters designate corresponding parts in all the views.

In the drawings—

FIGURE 2 is a plan view taken looking in the direction of the arrows on line 2—2 of FIGURE 1.

FIGURE 3 is a cross-sectional view taken on line 3—3 of FIGURE 1.

FIGURE 4 is a cross-sectional view taken on line 4—4 of FIGURE 1.

Briefly described, the invention comprising the subject matter of this invention relates to a push type clutch brake wherein, upon disengagement of the clutch, the brake is actuated to halt the rotation of the driven member and the rotating members of the transmission connected thereto in order to facilitate gear engagement and shifting from a gear of high ratio to a gear of lower ratio, which is commonly known as "upshifting." The brake is so arranged that, upon adjustment of the clutch throw-out member to provide for wear in the clutch, the brake will be automatically adjusted thereby providing a self-adjusting clutch brake.

Figure 1:
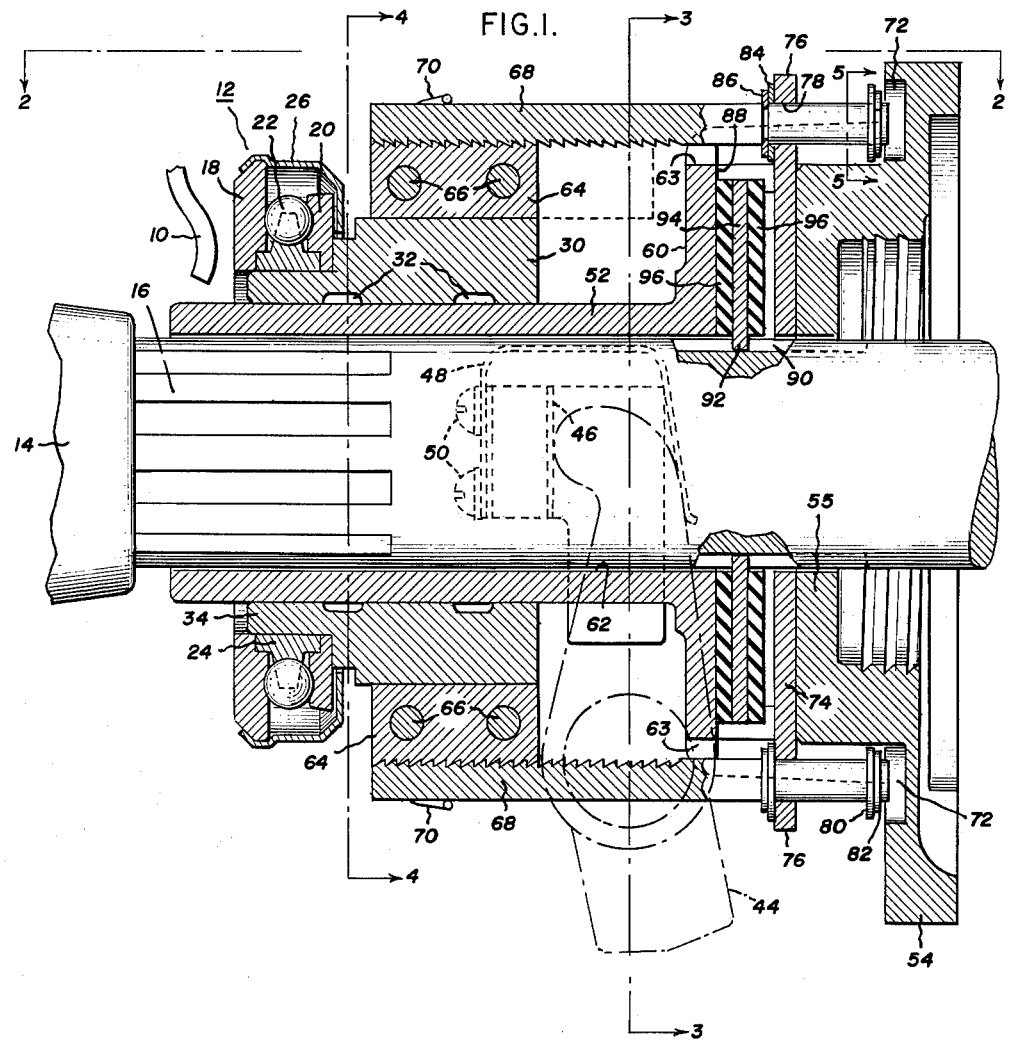
FIGURE 1 is a fragmentary side elevational view with parts in section and parts broken away showing the preferred embodiment of the invention in connection with a push type automotive clutch.

In FIGURE 1, the invention is shown in connection with fragments of a conventional single, or multiple disc clutch having a driving member and a driven member, together with the clutch discs to connect the driving member to the driven member in the conventional manner. As is also conventional, the clutch is provided with a pressure plate and a plurality of clutch release levers, a portion of one of which is indicated by the reference numeral 10 in FIGURE 1.

The clutch release levers 10 are engaged by the clutch throw-out member, generally indicated by the reference numeral 12, to disengage the driving member from the driven member, which, as shown, includes the hub 14, mounted on the splined shaft 16. The clutch throw-out unit comprises a release bearing including outer races 18 and 20, and a plurality of anti-friction members 22, held between the races by the carrier, or retainer member 24. The release bearing is also provided with an external cover member 26 and the entire release bearing is mounted on a release bearing carrier 30 mounted for sliding movement relative to the shaft 16.

The release bearing carrier, best seen in FIGURES 1, 2 and 3, comprises a main hub portion which is provided with a pair of internal lubricant grooves 32, a reduced forward portion 34 on which the release bearing is mounted, and a pair of outwardly extending side arms 36 and 38 which extend from the main portion of the member 30. The member 30 is also formed, as best seen in FIGURE 4 with a pair of bifurcated bosses 40 and 42 for a purpose to be hereinafter described.

The arms 36 and 38 are formed at their outward extremities so as to receive faces of the arms of a clutch throw-out yoke which is shown in the phantom lines in FIGURE 1 and identified by reference numeral 44. As seen in that figure, the bearing faces of the arms of the yoke 44 engage a U-shaped wear pad 46 carried by each end of the arms 36 and 38, and the bearing face of the arms are maintained in engagement with the wear pads 46 by the U-shaped springs 48, the wear pads 46 and springs 48 carried on the arms 36 and 38 by the screws 50, see FIGURE 4. This arrangement is conventional and the clutch throw-out yoke 44 is mounted on a split shaft which is journalled in bosses formed in the bell housing in the conventional manner. The split shaft is connected by suitable linkage to the clutch pedal so that upon depression of the pedal, the yoke 44 is moved in a counter clockwise direction, as viewed in FIGURE 1, to move the release bearing carrier 30 on the sleeve member 52 to the left, as viewed in FIGURE 1 thereby moving the release bearing 12 into engagement with the release levers 10 to disengage the clutch.

The sleeve member 52 is affixed to the transmission housing through the transmission front bearing cover 54 having a hub portion 55 by means of a plurality of bolts 56 which pass through a plurality of ears 58 formed on a hub 60 of the sleeve member 52 and ears 61 formed on the bearing cover 54. The member 52 is thus fixedly mounted and has a bore 62 so as to provide a clearance between the driven shaft 16 and the bore 62 in member 52. As best seen in FIGURES 1 and 3, the hub is provided at its top and bottom with a pair of clearance notches 63 for a purpose to be hereinafter described.

The release bearing carrier 30 has a pair of ratchet blocks 64 carried between the bifurcations of the bosses 40 and 42, and the blocks 64 are fixed in this position by the bolts 66 which pass through apertures formed in the bosses 40, 42 and are threaded into one of the arms forming the bosses 40 and 42. As best seen in FIGURE 1, the blocks 64 are formed along their upper surface with a plurality of ratchet teeth which open to the left, as viewed in FIGURE 1.

As shown in FIGURE 1, a pair of release or ratchet arms 68 are engaged with the blocks 64 by virtue of the ratchet teeth formed on the underside of the arms 68 which open to the right, as viewed in FIGURE 1. As will therefore be apparent the ratchet teeth on the blocks and arms provide cooperable means whereby, when the bearing release carrier 30 is moved to the left, as viewed in FIGURE 1, the teeth formed on the blocks 64 and the arms 68 will serve to move the arms 68 with the blocks 64.

Figure 5:
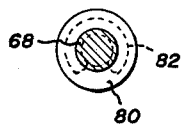
FIGURE 5 is a cross-sectional view taken on line 5—5 of FIGURE 1.

The bosses 40 and 42 on the release bearing carrier 30 are formed with a pair of apertures on their outer side faces in which are received the ends of the retaining springs 70 so as to normally maintain the ratchet arms 68 in engagement with the ratchet blocks 64. The arms 68 extend to the right, as viewed in FIGURE 1, through the clearance notches 63 in the hub portion 60 of the sleeve member 52, and are circular in cross section, as shown in FIGURE 5, at their rearward end and terminate a spaced distance away from a pair of counter bores 72 formed in the transmission front bearing cover 54. The arms 68 pass through a brake pressure plate 74 which is formed at its top and bottom with lugs 76 provided with apertures 78 through which the arms 68 pass. The ends of the arms 68 are provided with washers 80 which are maintained on the arms by means of snap rings 82 and similarly a second set of washers 84 are maintained on the arms 68 intermediate their ends, and to the left of the brake pressure plate 74, as viewed in FIGURE 1, by snap rings 86. As will be obvious, the washers 80 and 84 located at spaced apart points on arms 68 serve to effect a lost motion connection between the arms 68 and plate 76.

The inner surface of the hub 60 of the sleeve member 52 is formed with a brake face 88, and the shaft 16 is provided with a pair of rearward extending keyways 90 in which the keys 92 of a brake disc 94 are received. The brake disc 94 is provided on its forward and rearward faces with friction brake material 96 whereby, when the faces 96 are engaged between the plate 74 and the braking face 88, the driven shaft 16 will be braked to a halt. As will be understood, the brake disc 94 rotates, by virtue of the keys 92 and the keyway 90, with the shaft 16, whereas the brake pressure plate 74, and the sleeve member 52 formed with a braking face 88 are non-rotating members so as to effect this braking action.

In operation, as the ratchet arms 68 are moved forwardly with the ratchet blocks 64 fixedly mounted on the release bearing carrier 30, the clutch will be first disengaged by the engagement between the outer race 18 of the release bearing 12 and the clutch release levers 10. Continued further movement to the left, as viewed in FIGURE 1, will cause the washer 80 on each of arms 68 to engage the rear side of the brake pressure plate 74 to move it into engagement with the friction disc brake faces 96 and the fixed brake face 88 on the hub 60 of sleeve member 52 to brake the driven shaft 16 to a halt. Upon release, or movement to the right of the release bearing carrier 30, the washers 84 on the ratchet arms 68 will serve to move the brake pressure plate 74 to the right, as viewed in FIGURE 1, thus releasing the brake.

As the bearing carrier 30 is moved to the right in the conventional manner to adjust the clutch for wear taking place therein, between the friction discs and pressure plates (not shown), the ratchet teeth on the blocks 64 and arms 68 will allow the block 64 to move to the right, as viewed in FIGURE 1, to the extent of the dotted line position, thus in effect providing self adjusting means making the brake self-adjusting as the clutch is adjusted in the conventional manner. In the preferred embodiment of the invention, this allows an adjustment of one inch for wear in the clutch. The movement between the blocks 64 and the arms 68 will take place upon movement of the bearing carrier 30 to the right by virtue of the fact that the brake plate 74 will engage the forward face of the bearing cover hub 55 and the washers 84, and snap rings 86 will prevent any further movement to the right of the arms 68 while the teeth on the arms 68 and the blocks 64 are formed, as previously described, so as to allow the blocks to move to the right against the holding effect of the springs 70.

As will therefore be obvious, this invention provides a clutch brake wherein the brake is self-adjusting, as the clutch is adjusted to compensate for wear.

What we claim is:

1. A clutch brake for a clutch having a driven member surrounded by a fixed sleeve member including:
  (A) the clutch releasing member mounted for sliding movement on the fixed sleeve member,
    (a) said sleeve surrounding the driven member of said clutch and being spaced therefrom,
    (b) a brake face formed on said sleeve,
  (B) self-adjusting means connecting said releasing member to a brake pressure plate located rearwardly of said brake face,
  (C) friction brake means mounted on said driven member for rotation therewith between said brake pressure plate and said brake face whereby said friction means is engaged by said pressure plate and brake face upon movement of the clutch releasing member to first release said clutch and subsequently brake said driven member, and
  (D) said self-adjusting means being automatically movable in response to adjusting movement of said clutch releasing member to compensate for clutch wear.

2. The clutch brake of claim 1, wherein said self-adjusting means comprises:
  (A) a block fixedly mounted on said clutch releasing member,
  (B) an arm carried by said block, said block and arm being in abutting engagement, said arm passing through said brake pressure plate and having means positioned at spaced points on said arm engaging said brake pressure plate to engage and disengage said brake upon reciprocating movement of said arm,
  (C) means formed on the abutting faces of said block and arm for engaging said arm and block upon movement of said release member in a first direction and for disengaging said block and arm for relative movement therebetween upon movement of said release member and block in an opposite direction.

3. In a push-to-release clutch having a driven shaft and at least one release lever, a clutch brake operable upon release of said clutch to brake said driven shaft, said clutch brake including:
  (A) a fixedly mounted sleeve member having a brake face,
  (B) said driven shaft passing through a bore formed in said sleeve member in spaced relation to said bore,
  (C) friction brake means including a friction disc affixed to said shaft adjacent said brake face for rotation with said shaft,
  (D) a clutch release member slidably mounted on said sleeve for engaging said release lever to disengage said clutch,
  (E) a brake pressure plate located rearwardly of said friction disc, said pressure plate being cooperable with said sleeve brake face to engage said friction disc therebetween to brake said driven shaft upon movement of said release member to effect disengagement of said clutch,
  (F) self-adjusting means connecting said pressure plate by a lost motion connection to said release member, said adjusting means being operable upon adjusting movement of said release member on said sleeve member toward said brake face to maintain the relation of said lost motion connection between the engagement of said release member with said release lever and the engagement of said brake pressure plate with said friction disc and brake face on said sleeve.

4. The clutch brake of claim 3, wherein said self-adjusting means includes: a release arm,
  (A) cooperable means on the engaging faces of said release member and said release arm, said release arm extending rearwardly for connection to said brake plate, (B) said cooperable means being operable to permit relative movement between said arm and said release member in response to adjusting movement of said release member, and
(C) said cooperable means being further operable to move said arm with said release member upon movement of said release member to release said clutch.

5. The clutch brake of claim 2, wherein said last-mentioned means on the abutting surfaces of said arm and block comprises oppositely opening ratchet teeth.

References Cited by the Examiner

UNITED STATES PATENTS

| | | | |
|---|---|---|---|
| 2,252,906 | 8/41 | Williamson | 192—18 |
| 2,692,035 | 10/54 | Rabinow. | |
| 2,796,159 | 6/57 | Connors | 192—18 |
| 2,863,537 | 12/58 | Root | 192—13 |
| 2,890,773 | 6/59 | Martindell | 192—18 |

DAVID J. WILLIAMOWSKY, *Primary Examiner.*

THOMAS J. HICKEY, *Examiner.*